United States Patent [19]
Kim

[11] Patent Number: 5,838,829
[45] Date of Patent: Nov. 17, 1998

[54] METHOD AND APPARATUS FOR ENCODING A CONTOUR OF AN OBJECT IN A VIDEO SIGNAL

[75] Inventor: Jin-Hun Kim, Seoul, Rep. of Korea

[73] Assignee: Daewoo Electronics Co., Ltd., Seoul, Rep. of Korea

[21] Appl. No.: 788,948

[22] Filed: Jan. 23, 1997

[30] Foreign Application Priority Data

Mar. 22, 1996 [KR] Rep. of Korea ............... 1996 7857

[51] Int. Cl.$^6$ ................................. G06K 9/00
[52] U.S. Cl. ................................. 382/242; 382/243
[58] Field of Search ................. 348/416, 420, 348/699, 407, 402, 413; 382/242, 259, 236, 250, 241, 238, 257, 258, 190, 195, 199, 201, 202, 203, 209, 232, 235, 239, 243, 253, 255, 256, 266, 278, 286, 293, 307, 308; 358/433, 426, 261.2, 261.3, 428, 430, 432; 235/494

[56] References Cited

U.S. PATENT DOCUMENTS

| | | | |
|---|---|---|---|
| 5,086,489 | 2/1992 | Shimura | 382/238 |
| 5,117,287 | 5/1992 | Koike et al. | 382/238 |
| 5,271,093 | 12/1993 | Hata et al. | 395/120 |
| 5,457,754 | 10/1995 | Han et al. | 382/128 |

*Primary Examiner*—Leo H. Boudreau
*Assistant Examiner*—Bijan Tadayon
*Attorney, Agent, or Firm*—Anderson, Kill & Olick, P.C.

[57] ABSTRACT

A method encodes a current contour of an object in a video signal based on a previous contour thereof by extending the current contour over neighboring pixels thereto. In the encoded method, a displacement between the extended and the previous contours is found to set the displacement as a motion vector for the current contour. The previous contour is overlapped onto the extended contours based on the motion vector to thereby provide an overlapped previous contour and an overlapped extended contour. A mismatch between the overlapped contours is detected and encoded to thereby generate encoded error data, wherein, the encoded contour data includes the encoded error data and the motion vector.

20 Claims, 3 Drawing Sheets

METHOD AND APPARATUS FOR ENCODING A CONTOUR OF AN OBJECT IN A VIDEO SIGNAL

FIELD OF THE INVENTION

The present invention relates to a method and apparatus for encoding a contour of an object expressed in a video signal; and, more particularly, to a method and apparatus for encoding a current contour of the object based on a previous contour thereof through the use of an improved contour motion estimation technique.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference system.

One of such techniques for encoding video signals for a low bit-rate encoding system is an object-oriented analysis-synthesis coding technique, wherein an input video image is divided into objects, and three sets of parameters for defining the motion, contour and pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although there is no loss in the contour information.

To overcome the drawback, therefore, there have been proposed several methods, such as polygonal approximation and B-spline approximation, to encode the contour information. One of the disadvantages in the polygonal approximation is the roughness of the representation of the contour. The B-spline approximation is, on the other hand, capable of representing the contour more precisely; however, it requires a high-order polynomial to reduce the approximation error, resulting in an increased overall computational complexity of the video encoder.

One of the techniques introduced to ameliorate such problems associated with the rough representation of the contour or the increased computational complexity in the above approximation approaches is a contour approximation technique employing a transform technique.

In an apparatus which adopts the contour approximation technique based on the polygonal approximation and the transform technique, e.g., a discrete sine transform(DST), as disclosed in a commonly owned copending application, U.S. Ser. No. 08/423,604, entitled "A CONTOUR APPROXIMATION APPARATUS FOR REPRESENTING A CONTOUR OF AN OBJECT", a number of vertex points are determined through the use of polygonal approximation and the contour of an object is approximated by line segments joining the vertex points. And then, N sample points for each line segment are selected and an approximation error at each of the N sample points is calculated in order to obtain a set of approximation errors for each line segment. Thereafter, sets of DST coefficients are generated by performing a one-dimensional DST operation on each set of approximation errors.

Even though the aforementioned DST based contour approximation technique is capable of alleviating the rough representation and computational complexity and reducing the volume of transmission data, it still remains desirable to further reduce the volume of transmission data.

SUMMARY OF THE INVENTION

It is, therefore, a primary object of the invention to provide an improved contour encoding method and apparatus which is capable of further reducing the amount of transmission data through the use of a contour motion estimation technique.

In accordance with the invention, there is provided a method for encoding a current contour of an object in a video signal based on a previous contour thereof, comprising the steps of: (a) extending the current contour over neighboring pixels thereof to thereby generate an extended contour; (b) displacing the extended contour within a predetermined search range; (c) counting at each displacement the number of overlapped pixels between the extended contour and the previous contour; (d) finding a displacement yielding a maximum number of overlapped pixels and setting the displacement as the motion vector; (e) overlapping the previous and the extended contours based on the motion vector to thereby provide an overlapped previous contour and an overlapped extended contour; (f) detecting a mismatch between the overlapped contours; (g) encoding the mismatch to thereby generate encoded error data; and (h) providing encoded contour data for the current contour, the encoded contour data including the encoded error data and the motion vector.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
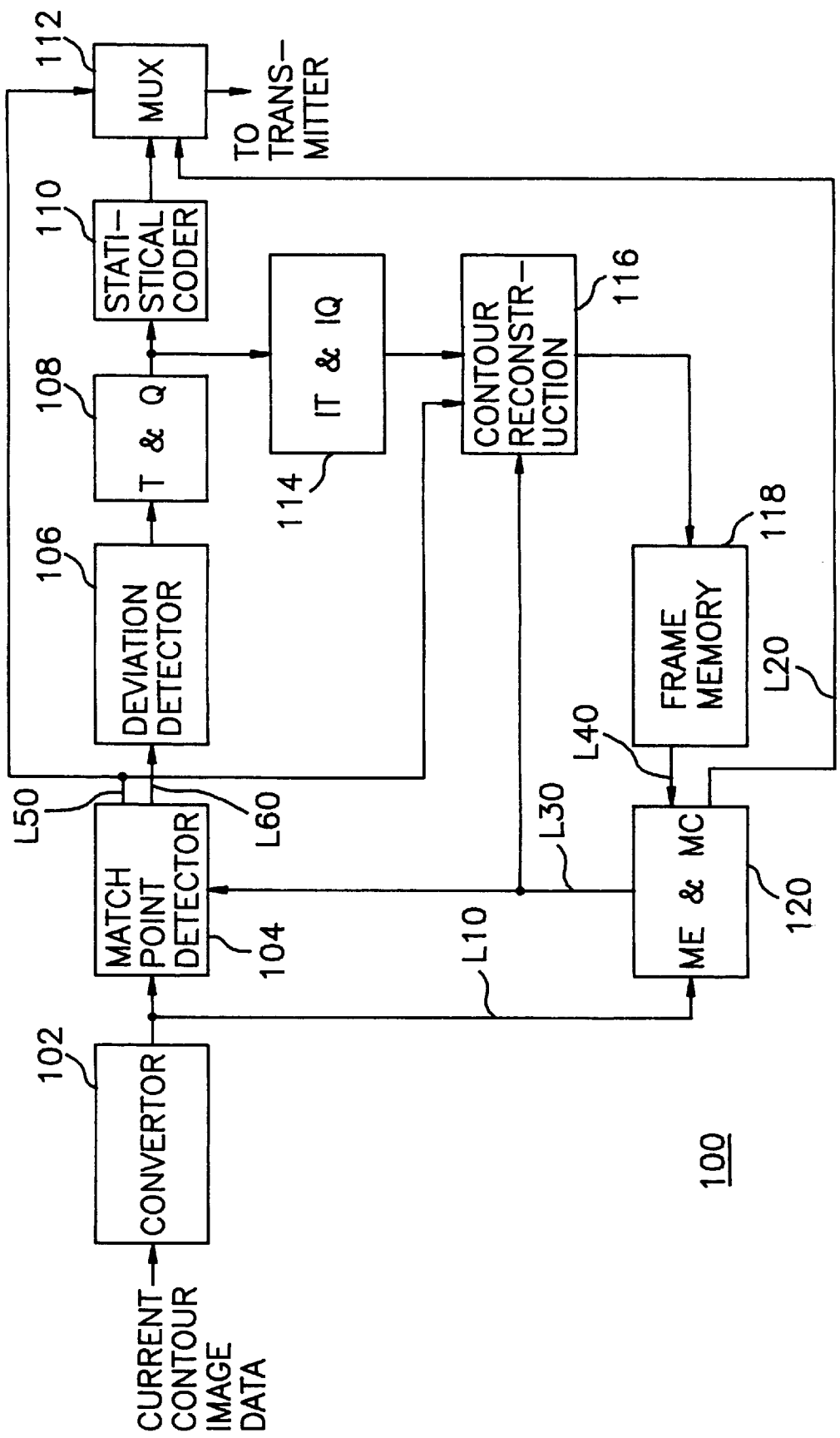
FIG. 1 represents a block diagram of an apparatus for encoding a contour image in accordance with the present invention.

In FIG. 1, there is shown a block diagram of an apparatus 100 for encoding a contour image in accordance with the present invention, wherein current contour image data representing position information of current contour pixels constituting a current contour of an object is fed to a convertor 102. The convertor 102 converts the current contour into an extended contour by extending the current contour up to±P pixels along the horizontal and the vertical directions, P being a positive integer. The extended contour data representing positions of extended contour pixels constituting the extended contour is provided to a match point detector 104 and a motion estimation and compensation( ME & MC) block 120 via a line L10. In a preferred embodiment of the invention, P is assumed to be 1. In such an instance, an extended contour pixel may be defined as:

$$C'(i,j) = C(i,j) \| C(i-1,j) \| C(i+1,j) \| C(i,j-1) \| C(i,j+1)$$

wherein a notation "∥" represents a logical OR operator; and C'(i,j) and C(i,j), contour pixels on the extended and current contours residing at a position (i,j), respectively.

As can be seen from the above, the extended contour pixels consist of the current contour pixels and the pixels adjacent to the current pixels along the x, y directions. In another preferred embodiment of the present invention, the extended contour pixel may be defined as:

$$C'(i,j) = C(i,j) \| C(i-1,j) \| C(i+1,j) \| C(i,j-1) \| C(i,j+1) \| C(i-1,j-1) \| C(i-1,j+1) \| C(i+1,j+1) \| C(i+1,j-1)$$

In other words, the extended contour pixels may be constituted by the current contour pixels and the pixels adjacent to the current contour pixels along the x, y directions and two diagonal directions.

The ME & MC block 120 retrieves previous contour image data from a frame memory 118; and motion-estimates the extended contour against the previous contour within a predetermined search range to find a motion vector for the current contour. The previous contour image data represents position information of previous contour pixels constituting the previous contour. Specifically, at the ME & MC block 120, the extended contour is shifted on a pixel-by-pixel basis within the search range of, e.g., ±16 pixels along the horizontal and the vertical directions; and the number of extended contour pixels overlapped with previous contour pixels is counted at each displacement. The motion vector for the current contour corresponds to a displacement which yields a maximum number of extended contour pixels overlapped. Thereafter, a predicted contour is obtained by shifting the previous contour toward the extended contour by the motion vector. Outputs from the ME & MC block 120 are: the motion vector to a multiplexer(MUX) 112 via a line L20; and predicted contour image data representing positions of predicted contour pixels on the predicted contour to a match point detector 104 and a contour reconstruction block 116 through a line L30.

The match point detector 104, responsive to the extended contour image data from the convertor 102 and the predicted contour image data provided from the ME & MC block 120, determines a plurality of match points, each of the match points represents an intersection point between the predicted contour and an inner or an outer contour boundary of the extended contour. The inner and the outer contour boundaries are made of contour boundary pixels, i.e., extended contour pixels located at the inner and the outer peripheries thereof, respectively.

Figure 2:
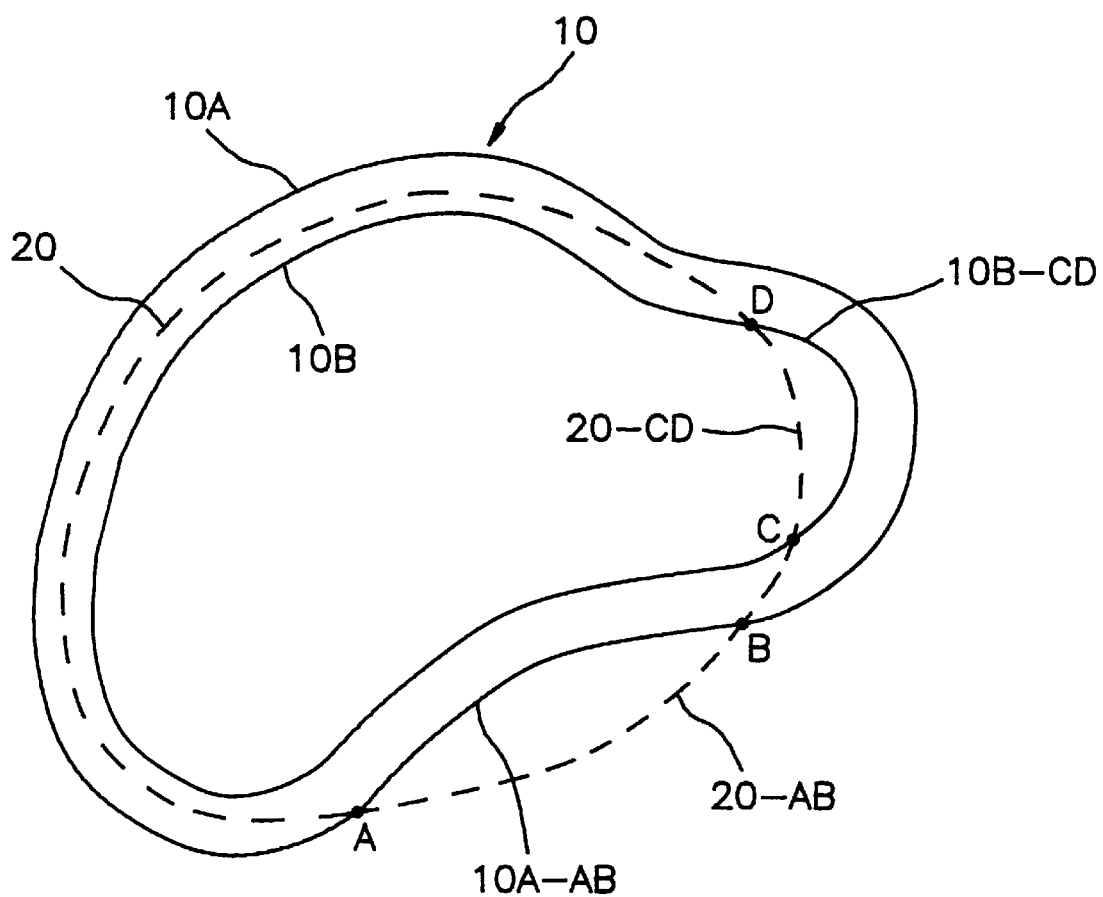
FIG. 2 depicts an explanatory diagram for illustrating a match point determining procedure in accordance with the present invention.

Referring to FIG. 2, there is exemplarily depicted a predicted contour 20 overlapped onto an extended contour 10, wherein the predicted contour 20 meets an outer contour boundary 10A and an inner contour boundary 10B of the extended contour 10 at match points A, B and C, D, respectively. The extended and the predicted contours overlapped together generate a plurality of predicted contour segments, e.g., 20-AB and 20-CD, and their corresponding extended contour segments, e.g., 10A–AB and 10B–CD, of an identical number. Each predicted contour segment is defined as a portion of the predicted contour including a pair of match points at the ends thereof and predicted contour pixels disposed which are between the match points and reside outside the extended contour; and each extended contour segment belongs to a portion of the extended contour non-overlapped with the predicted contour includes a pair of match points at the ends thereof and contour boundary pixels therebetween. A predicted contour segment and its corresponding extended contour segment meet at two match points and form a closed loop. For instance, the predicted contour segment 20-AB meets its corresponding extended contour segment 10A–AB at the match points A and B and the segments 20-AB and 10A–AB form a closed loop. Similarly, the predicted contour segment 20-CD and its corresponding extended contour segment 10B–CD share the match points C and D and are of a closed loop as a whole.

Referring back to FIG. 1, the match point detector 104 provides match point information via a line L50 to the MUX 112, a deviation detector 106 and the contour reconstruction block 116, wherein the match point information represents positions of a pair of match points for each matched contour segment, the matched contour segment representing a predicted contour segment and its corresponding extended contour segment. In addition, the match point detector 104 provides via line L60 matched contour segment data to the deviation detector 106, the matched contour segment data representing positions of contour pixels on each matched contour segment.

The deviation detector 106 selects M sample points on a line segment joining two match points for each matched contour segment and calculates an approximation error at each of the M sample points based on the match point information and the matched contour segment data, M being a positive integer. In a preferred embodiment of the invention, the M sample points are equi-distanced such that a distance between two neighboring sample points and the one between a sample point. and its neighboring match point are equal to the length of a line segment divided by (M+1).

In the low bit-rate encoding system, errors of one pixel in representing the current contour might be tolerable and, therefore, in the preferred embodiment of the invention, the approximation errors are detected between the predicted contour and the extended contour in lieu of the current contour itself. By processing the approximation errors this way, a computational burden can be reduced significantly. It should be noted that a mismatch of the predicted contour with respect to the extended contour should be less severe than that to the current contour. In determining the approximation errors, M number of, e.g., 8, sample points are determined first on a line segment joining two match points for a matched contour segment. Thereafter, a line normal to the line segment is drawn at each sample point; and intersections are determined on a predicted contour segment and an extended contour segment of the matched contour segment, each intersection representing a point at which each normal line crosses the predicted contour segment or the extended contour segment. An approximation error is defined by the displacement between the intersections on each normal line.

Figure 3A:
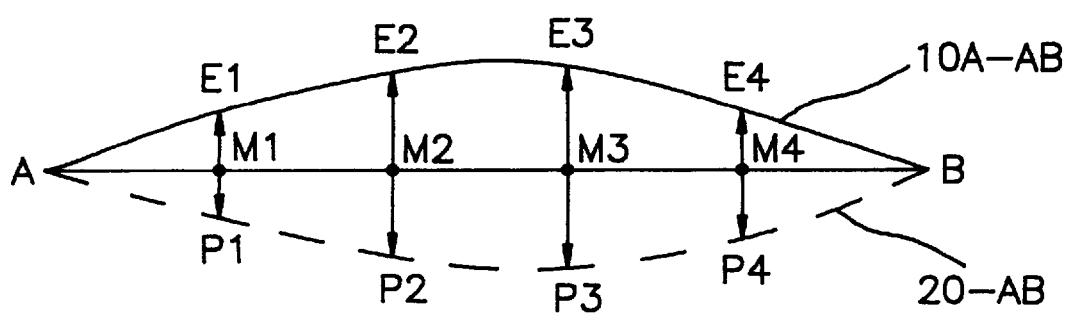
FIGS. 3A and 3B illustrate approximation errors for matched segments.
Figure 3B:
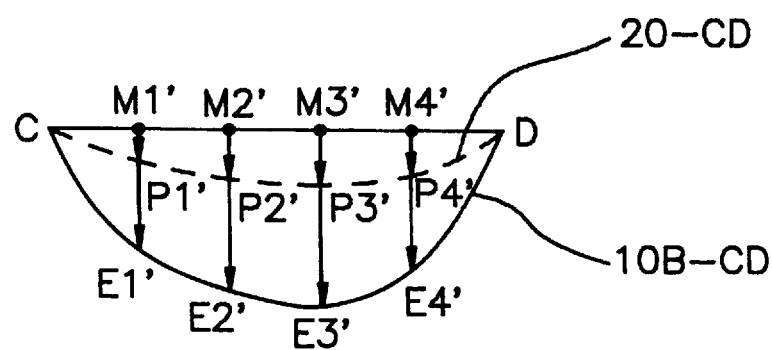

Referring to FIGS. 3A and 3B, there are illustrated the matched contour segment AB, including the predicted contour segment 20-AB and the extended contour segment 10A–AB, and the matched contour segment CD which includes the predicted contour segment 20-CD and the extended contour segment 10B–CD shown in FIG. 2, wherein M is assumed to be 4 for the shake of simplicity. In the drawings, M1 to M4 and M1' to M4' represent sample points determined on the respective line segments AB and CD; E1 to E4 and P1 to P4, intersections on the extended contour segment 10A–AB and the predicted contour segment 20-AB; and E1' to E4' and P1' to P4', intersections on the extended contour segment 10B–CD and the predicted contour segment 20-CD.

An approximation error is obtained by subtracting the displacement measured from a sample point to an intersection on the predicted contour segment from the one measured from the sample point to an intersection on the extended contour segment. For instance, an approximation error at the sample point M1 is obtained by subtracting the displacement M1P1 from the displacement M1E1, and so on. The displacement includes a distance between the sample point and the intersection and a sign indicating a relative position of the intersection with respect to the line segment on which the sample point resides. The sign of the displacement is chosen in a predetermined manner. For instance, the line segment AB is assumed to be on the x axis with a lower indexed match point, e.g., A, on left side and higher indexed match point, e.g., B, on the right hand side. After setting the line segment, the positive sign is assigned to a displacement along the upward direction and the negative sign, along the downward direction. In such a fashion, the displacements M1E1 to M4E4 are assigned to have the positive sign and the remaining displacements M1P1 to M4P4, M1'P1' to M4'P4' and M1'E1' to M4'E4' are all have the negative sign.

Referring back to FIG. 1, the deviation detector 106 provides a set of approximation errors for each matched contour segment to a transformation and quantization (T & Q) block 108. The T & Q block 108 performs one-dimensional transform on each set of approximation errors to produce a set of transform coefficients; and quantizes the set of transform coefficients to provide a set of quantized coefficients to a statistical coder 110 and an inverse transform and inverse quantization (IT & IQ) block 114. In the preferred embodiment of the invention, the transformation of the approximation errors is carried out by using the DST (discrete sine transform) technique. However, it should be apparent to those skilled in the art that other transform techniques, e.g., DCT (discrete cosine transform), may be used in lieu of the DST.

The IT & IQ block 114 performs IT and IQ operation on each set of quantized coefficients to provide a set of reconstructed errors to the contour reconstruction block 116. At the contour reconstruction block 116, reconstructed current contour is provided based on each set of reconstructed errors from the IT & IQ block 114, the predicted contour image data from on the line L30 the ME & MC block 120 and the match point information on the line L50 from the match point detector 104. Specifically, the sample points are provided first on each line segment based on the match point information on the line L50 in the same fashion as in the deviation detector 106. And then, the intersections, e.g., P1 to P4 and P1' to P4', are determined on the predicted contour segments, e.g., 20-AB and 20-CD shown in FIGS. 3A and 3B, based on the predicted contour image data on the line L30. Thereafter, the respective reconstructed error is added to their corresponding intersections on the predicted contour segments to provide reconstructed extended contour segments. The reconstructed current contour provided in a fashion described above is constituted by portions of the predicted contour overlapped with the extended contour, e.g., predicted contour segments AD and CB shown in FIG. 2, and the reconstructed extended contour segments which roughly follows the extended contour segments 10A–AB and 10B–CD. Reconstructed current contour data is then fed to the frame memory 118 and stored therein as previous contour image data for a next contour.

At the statistical coder 110, each set of quantized coefficients is encoded by using, e.g., a VLC (variable length coding) technique to produce encoded error data. The encoded error data is then applied to the MUX 112. The MUX 112 multiplexes the encoded error data, the match point information on the line L50 and the motion vector on the line L20 to provide encoded contour data to a transmitter (not shown) for the transmission thereof. At a decoder of a receiving end, the reconstructed current contour is provided in an identical manner as in the contour reconstruction block 116.

It should be noted that even though the approximation errors have been described to be estimated between the predicted contour and the extended contour in the preferred embodiment of the invention, the scheme can be applied to the current contour instead of the extended contour. In such a case, the approximation errors are obtained between the predicted and the current contours and the current contour can be more precisely reconstructed at the expense of computational complexity.

While the present invention has been described with respect to the particular embodiments, it will be apparent to those skilled in the art that various changes and modifications may be made without departing from the scope of the invention as defined in the following claims.

What is claimed is:

1. A method for encoding a current contour of an object in a video signal based on a previous contour thereof, comprising the steps of:

(a) extending the current contour over neighboring pixels thereof to thereby generate an extended contour;

(b) finding a displacement between the extended and the previous contours and setting the displacement as a motion vector for the current contour; and (c) encoding the current contour based on the motion vector.

2. The method according to claim 1, wherein said step (b) includes the steps of:

(b1) displacing the extended contour within a predetermined search range;

(b2) counting at each displacement the number of overlapped pixels between the extended contour and the previous contour; and (b3) finding a displacement yielding a maximum number of overlapped pixels and setting the displacement as the motion vector.

3. The method according to claim 1, wherein said encoding step (c) includes the steps of:

(c1) overlapping the previous and the extended contours based on the motion vector to thereby provide an overlapped previous contour and an overlapped extended contour;

(c2) detecting a mismatch between the overlapped contours;

(c3) encoding the mismatch to thereby generate encoded error data; and (c4) providing encoded contour data for the current contour, the encoded contour data including the encoded error data and the motion vector.

4. The method according to claim 3, wherein said step (c2) includes the steps of:

(c21) finding match points, wherein each match point represents an intersection point between the overlapped previous contour and a contour boundary of the overlapped extended contour, the overlapped previous contour and the overlapped extended contour having predicted and extended contour pixels thereon, respectively;

(c22) determining matched contour segments, wherein each matched contour segment includes a predicted contour segment and an extended contour segment, the predicted contour segment having a pair of match points at the ends thereof and predicted contour pixels disposed therebetween and non-overlapping with the overlapped extended contour, the extended contour segment meeting the predicted contour segment at the pair of match points and having extended contour pixels disposed therebetween and residing on the contour boundary, each matched contour segment being of a closed loop;

(c23) detecting a set of approximation errors between the predicted and the extended contour segments included in each matched contour segment; and (c24) setting the sets of approximation errors for the matched contour segments as the mismatch.

5. The method according to claim 4, wherein said step (c23) includes the steps of:

(c231) taking M number of sample points on a line segment joining the pair of match points, M being a positive integer;

(c232) drawing a normal line to the line segment at each sample point;

(c233) finding an intersection between the normal line and each of the predicted and the extended contour segments to thereby provide two intersections on the normal line; and (c234) obtaining the set of approximation errors for each matched contour segment, each approximation error representing a displacement between the intersections on the normal line.

6. The method according to claim 5, wherein said step (c3) includes the steps of:

(c31) transforming each set of approximation errors to provide a set of transform coefficients;

(c32) quantizing the set of transform coefficients to provide a set of quantized coefficients; and (c33) statistically coding the set of quantizing coefficients to thereby generate the encoded error data.

7. The method according to claim 5, wherein said encoded contour data further includes match point information representing positions of the match points.

8. The method according to claim 1, wherein said encoding step (c) includes the steps of:

(c1') overlapping the previous and the current contours based on the motion vector to thereby provide an overlapped previous contour and an overlapped current contour;

(c2') finding match points, each match point representing an intersection point between the overlapped previous contour and the overlapped current contour;

(c3') detecting a mismatch between the overlapped contours to thereby generate encoded error data; and (c4') providing encoded contour data for the current contour, the encoded contour data including the encoded error data, the motion vector and match point information representing positions of the match points.

9. The method according to claim 1, wherein said extended contour is obtained by extending the current contour up to P pixels along a horizontal and a vertical directions, P being a positive integer.

10. The method according to claim 8, wherein P is 1.

11. The method according to claim 1, wherein a pixel on the extended contour is defined as:

$$C'(i,j)=C(i,j)\|C(i-1,j)\|C(i+1,j)\ \|C(i,j-1)\|C(i,j+1)$$

wherein "$\|$" represents a logical OR operator; and $C'(i,j)$ and $C(i,j)$ represent pixels on the extended and the current contours at a position $(i,j)$, respectively.

12. The method according to claim 10, wherein a pixel on the extended contour is defined as:

$$C'(i,j)=C(i,j)\|C(i-1,j)\|C(i+1,j)\ \|C(i,j-1)\|C(i,j+1)\ \|C(i-1,j-1)\|C(i-1,j+1)\|C(i+1,j+1)\ \|C(i+1,j-1)$$

wherein "$\|$" represents a logical OR operator; and $C'(i,j)$ and $C(i,j)$ are pixels on the extended and the current contours at a position $(i,j)$, respectively.

13. An apparatus for encoding a current contour of an object in a video signal, the current contour including current contour pixels thereon, comprising:

means for storing previous contour data representing previous contour pixels constituting a previous contour;

means for generating an extended contour having thereon extended contour pixels, the extended contour pixels including the current contour pixels and neighboring pixels thereto;

means for retrieving the previous contour data to provide a motion vector for the current contour by motion estimating the extended contour with respect to the previous contour;

means for detecting a mismatch between the extended contour and the previous contour based on the motion vector;

means for encoding the mismatch to thereby generate encoded error data; and means for providing encoded contour data for the current contour, the encoded contour data including the encoded error data and the motion vector.

14. The apparatus according to claim 13, wherein each of said neighboring pixels is disposed within P pixels away from a current contour pixel, P being a positive integer.

15. The apparatus according to claim 13, wherein a pixel on the extended contour is defined as:

$$C'(i,j)=C(i,j)\|C(i-1,j)\|C(i+1,j)\ \|C(i,j-1)\|C(i,j+1)$$

wherein "$\|$" represents a logical OR operator; and $C'(i,j)$ and $C(i,j)$ represent pixels on the extended and the current contours at a position $(i,j)$, respectively.

16. The apparatus according to claim 13, wherein a pixel on the extended contour is defined as:

$$C'(i,j)=C(i,j)\|C(i-1,j)\|C(i+1,j)\ \|C(i,j-1)\|C(i,j+1)\ \|C(i-1,j-1)\|C(i-1,j+1)\|C(i+1,j+1)\ \|C(i+1,j-1)$$

wherein "$\|$" represents a logical OR operator; and $C'(i,j)$ and $C(i,j)$ represent pixels on the extended and the current contours at a position $(i,j)$, respectively.

17. The apparatus according to claim 13, wherein said retrieving means includes:

means for displacing the extended contour on a pixel-by-pixel basis within a predetermined search range;

means for counting, at each displacement, the number of extended contour pixels overlapped with the previous contour pixels; and means for setting a displacement which yields a largest number of overlapped contour pixels as the motion vector.

18. The apparatus according to claim 13, wherein said detecting means includes:

means for generating a predicted contour by shifting the previous contour toward the extended contour by the motion vector, the predicted contour having predicted contour pixels thereon;

means for deciding match points, the match points being intersection points between the predicted contour and contour boundaries of the extended contour;

means for obtaining matched contour segments, wherein each matched contour segment includes a predicted and an extended contour segments meeting at a pair of match points, the predicted and the extended contour segments forming a closed loop, the predicted contour segment including predicted contour pixels connected together and residing outside the extended contour and the extended contour segment including extended contour pixels positioned on one of the contour boundaries;

means for computing a set of errors for each matched contour segment, each terror representing a displacement between a point on the predicted contour segment and its corresponding point on the extended contour segment; and means for setting sets of errors for the match contour segments as the mismatch.

19. The apparatus according to claim 18, wherein said encoding means includes:

means for transforming each set of errors into a set of transform coefficients;

means for quantizing each set of transform coefficients to provide a set of quantized coefficients; and means for statistically coding each set of quantized coefficients to thereby provide the encoded error data.

20. The apparatus according to claim 19, wherein said encoded contour data further includes match point data representing positions of the match point.

* * * * *

UNITED STATES PATENT AND TRADEMARK OFFICE

CERTIFICATE OF CORRECTION

PATENT NO.     : 5,838,829
DATED          : November 17, 1998
INVENTOR(S)    : Jin-Hun Kim It is certified that error appears in the above-identified patent and that said Letters Patent is hereby corrected as shown below:

On the title page, item:

[30]  Foreign Application Priority Data

Mar. 22, 1996   [KR]   Rep. of Korea          96-7857

Signed and Sealed this

Twenty-third Day of February, 1999

Attest:

Q. TODD DICKINSON

*Attesting Officer*     *Acting Commissioner of Patents and Trademarks*